United States Patent [19]

Saijima

[11] Patent Number: 5,530,788
[45] Date of Patent: Jun. 25, 1996

[54] ELECTRIC MOTOR DRIVE CONTROL APPARATUS

[75] Inventor: Atsuo Saijima, Atsugi, Japan

[73] Assignee: Unisia Jecs Corporation, Atsugi, Japan

[21] Appl. No.: 391,167

[22] Filed: Feb. 21, 1995

[30] Foreign Application Priority Data

Feb. 28, 1994 [JP] Japan .................................. 6-030346

[51] Int. Cl.⁶ .................................................. H02P 7/29
[52] U.S. Cl. ........................ 388/811; 388/815; 318/434; 318/453
[58] Field of Search ........................ 388/809, 811, 388/815, 921; 318/432, 433, 434, 452, 453, 454, 455

[56] References Cited

U.S. PATENT DOCUMENTS 4,514,670  4/1985  Fassel et al. ........................... 318/467
4,990,836  2/1991  Nakase et al. ......................... 318/285

FOREIGN PATENT DOCUMENTS 2-81769   3/1990   Japan .

*Primary Examiner*—Bentsu Ro
*Attorney, Agent, or Firm*—Foley & Lardner

[57] ABSTRACT

An apparatus for controlling a drive circuit having a supply of electric power from a power source to drive an electric motor. The drive circuit includes at least one switching element operable between a first state connecting the electric motor to the power source and a second state disconnecting the electric motor from the power source in the second state. An overcurrent detection signal is produced when the current flow through the electric motor exceeds a predetermined value. In the presence of the overcurrent detection signal, the switching element is changed to the second state. The switching element is fixed in the second state when the repetitive period of the overcurrent detection signal is less than a predetermined value to avoid an excessive amount of heat generated from the switching element because of transient power losses.

4 Claims, 5 Drawing Sheets

ELECTRIC MOTOR DRIVE CONTROL APPARATUS

BACKGROUND OF THE INVENTION

This invention relates to an electric motor drive control apparatus suitable for use with a vehicle power steering unit.

For example, Japanese Patent Kokai No. 2-81769 discloses an electric motor drive control apparatus which employs four switching transistors for pulse width modulation (PWM) control of an electric motor used in assisting the driver's vehicle steering operation. When the current flow through the electric motor exceeds a first predetermined value, the transistors are controlled to interrupt the power to the electric motor. The transistors are returned to the initial states to resume the PWM control of the electric motor when the motor current decreases below a second predetermined value less than the first predetermined value. With such a conventional electric motor drive control apparatus, the transistors are switched repetitively between two states every time the motor current exceeds the first predetermined value. If the transistors are switched at a very short repetitive period, there will be great transient power losses to generate an excessive amount of heat from the transistors so as to degrade the operation reliability.

SUMMARY OF THE INVENTION

It is a main object of the invention to provide an improved electric motor drive control apparatus which can avoid an excessive amount of heat produced from motor drive transistors.

There is provided, in accordance with the invention, an apparatus for controlling a drive circuit having a supply of electric power from a power source to drive an electric motor. The drive circuit includes at least one switching element operable between a first state connecting the electric motor to the power source and a second state disconnecting the electric motor from the power source in the second state. The electric motor drive control apparatus comprises means for sensing a current flow through the electric motor, means for producing an overcurrent detection signal when the sensed current exceeds a predetermined value, means responsive to the overcurrent detection signal for holding the switching element to the second state, means for measuring a repetitive period of the overcurrent detection signal, and means for fixing the switching element in the second state when the measured repetitive period is less than a predetermined value.

BRIEF DESCRIPTION OF THE DRAWINGS

The invention will be described in greater detail by reference to the following description taken in connection with the accompanying drawings, in which.

DETAILED DESCRIPTION OF THE INVENTION

Figure 1:
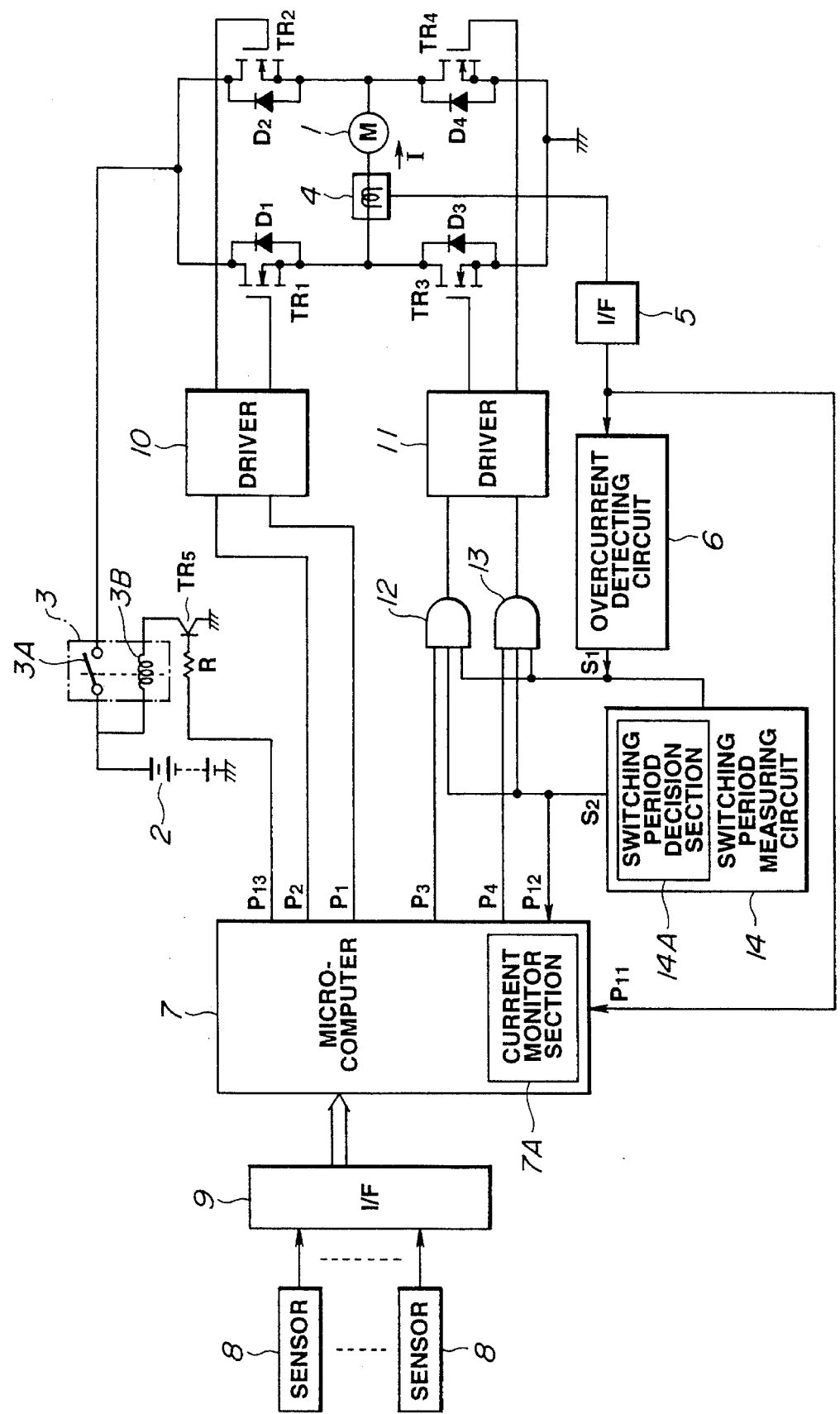
FIG. 1 is a schematic block diagram showing one embodiment of an electric motor drive control apparatus made in accordance with the invention.

With reference to the drawings, where like numerals refer to like parts in the several views, and in particular to FIG. 1, there is shown a schematic block diagram of an electric motor drive control apparatus embodying the invention. Four switching elements, in the form of field effect transistors TR1, Tr2, TR3 and TR4, constitute a drive circuit along with feedback diodes D1, D2, D3 and D4 associated with the respective transistors TR1, TR2 , TR3 and TR4 for driving a bi-directional electric motor to produce a force in a direction assisting the driver's steering operation. A first drive circuit 10 drives the first and second transistors TR1 and TR2 in response to control signals fed thereto from a microcomputer 7. A second drive circuit 11 drives the third and fourth transistors TR3 and TR4 in response to PWM control signals fed thereto through AND circuits 12 and 13 from the microcomputer 7. The drive circuit has a supply of power from a car battery 2 through a normally open relay controlled switch 3A which is controlled by a relay coil 3B connected to the ground through a switching transistor TR5. The switching transistor TR5 is turned on to energize the relay coil 3B so as to close the relay controlled switch 3A in the presence of a relay drive signal applied to its base electrode from the microcomputer 7. The microcomputer 7 has a current monitor section 7A to be described later in detail. The electric motor 1 rotates in a first direction when the first transistor TR1 is turned on and the fourth transistor TR4 is switched on and off in the presence of a PWM control signal. The electric motor 1 rotates in a second direction opposite to the first direction when the second transistor TR2 is turned on and the third transistor TR3 is switched on and off in the presence of a PWM control signal.

Figure 2:
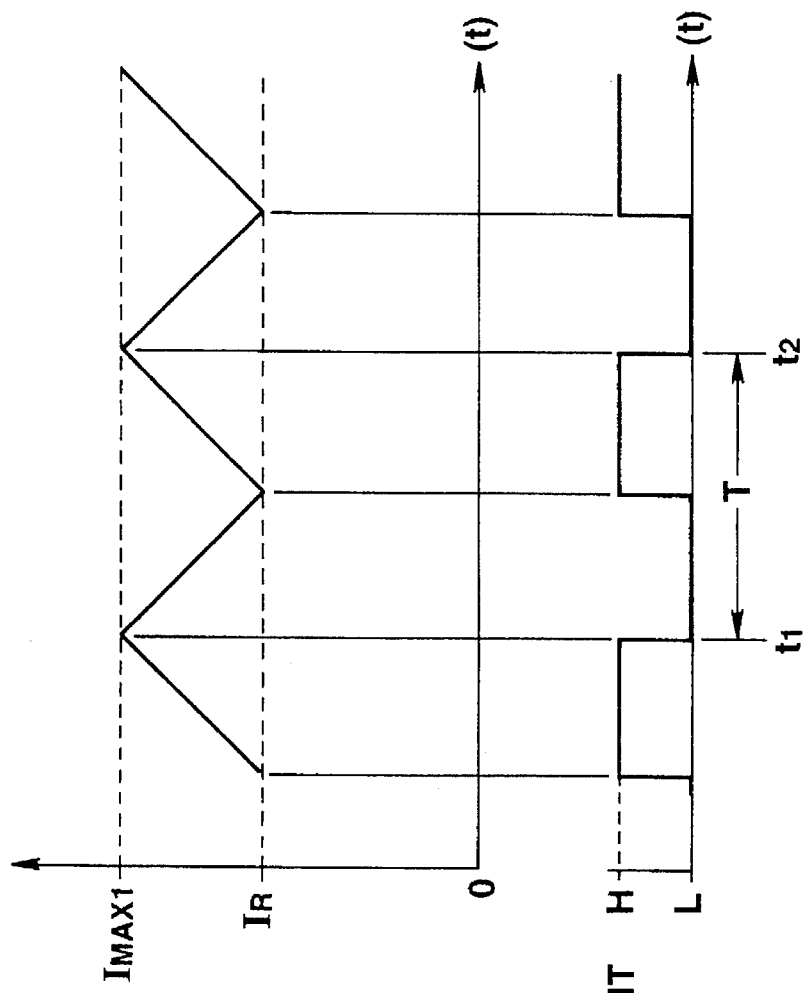
FIG. 2A is a graph showing motor current variations with the lapse of time.
FIG. 2B is a graph showing overcurrent detection signal variations with the lapse of time.

A current sensor 4 is provided for sensing the current flow through the electric motor 1 and producing a signal indicative of the sensed motor current I. The motor current signal is fed from the current sensor 4 through an interface circuit 5 to an overcurrent detecting circuit 6 and also to the current monitor section 7A. The overcurrent detecting circuit 6 compares the motor current signal hysteretically with a higher reference value $I_{MAX1}$ when the motor current signal is increasing and with a lower reference value $I_R$ when the motor current signal is decreasing. The overcurrent detecting circuit 6 produces an overcurrent detection signal $S_1$ which has a low level when the motor current signal increases above the higher reference value $I_{MAX1}$ and a high level when the motor current signal decreases below the lower reference value $I_R$, as shown in FIGS. 2A and 2B. The overcurrent detection signal $S_1$ is fed from the overcurrent detecting circuit 6 to the AND circuits 12 and 13.

The overcurrent detection signal $S_1$ is also fed from the overcurrent detecting circuit 6 to a switching period measuring circuit 14. The switching period measuring circuit 14 includes a timer counter which starts counting clock pulses at a time t1 when the overcurrent detection signal $S_1$ changes from the high level to the low level and stops the clock pulse counting operation at a time t2 when the overcurrent decision signal $S_1$ changes from the high level to the low level again, as indicated in FIG. 2B. Thus, the count accumulated in the timer counter corresponds to the switching period T between the times t1 and t2, that is, the repetitive period T of the overcurrent decision signal $S_1$. The switching period measuring circuit 14 also includes a switching period decision section 14A which produces a decision signal $S_2$ held at a low level when the measured switching period T is equal to or less than a predetermined value $T_{MIN}$ and at a high level when the measured switching period T is greater than the predetermined value $T_{MIN}$. The predetermined value $T_{MIN}$ is set at a value smaller than the pulse width of the PWM control signals fed from the microcomputer 7. For this reason, the switching period T is normally held longer than the predetermined value $T_{MIN}$ and the decision signal $S_2$ is held at the high level. The decision signal $S_2$ is fed from the switching period measuring circuit 14 to the AND circuits 12 and 13 and also to the microcomputer 7.

The microcomputer 7 produces control signals from the output terminals P1, P2, P3 and P4 to control the electric motor 1. This production is made based on the signals fed thereto through an interface circuit 9 from various sensors 8. The output terminals P1 and P2 are connected to the first driver circuit 10, and the output terminals P3 and P4 are connected through the AND circuits 12 and 13 to the second driver circuit 11.

Figure 3:
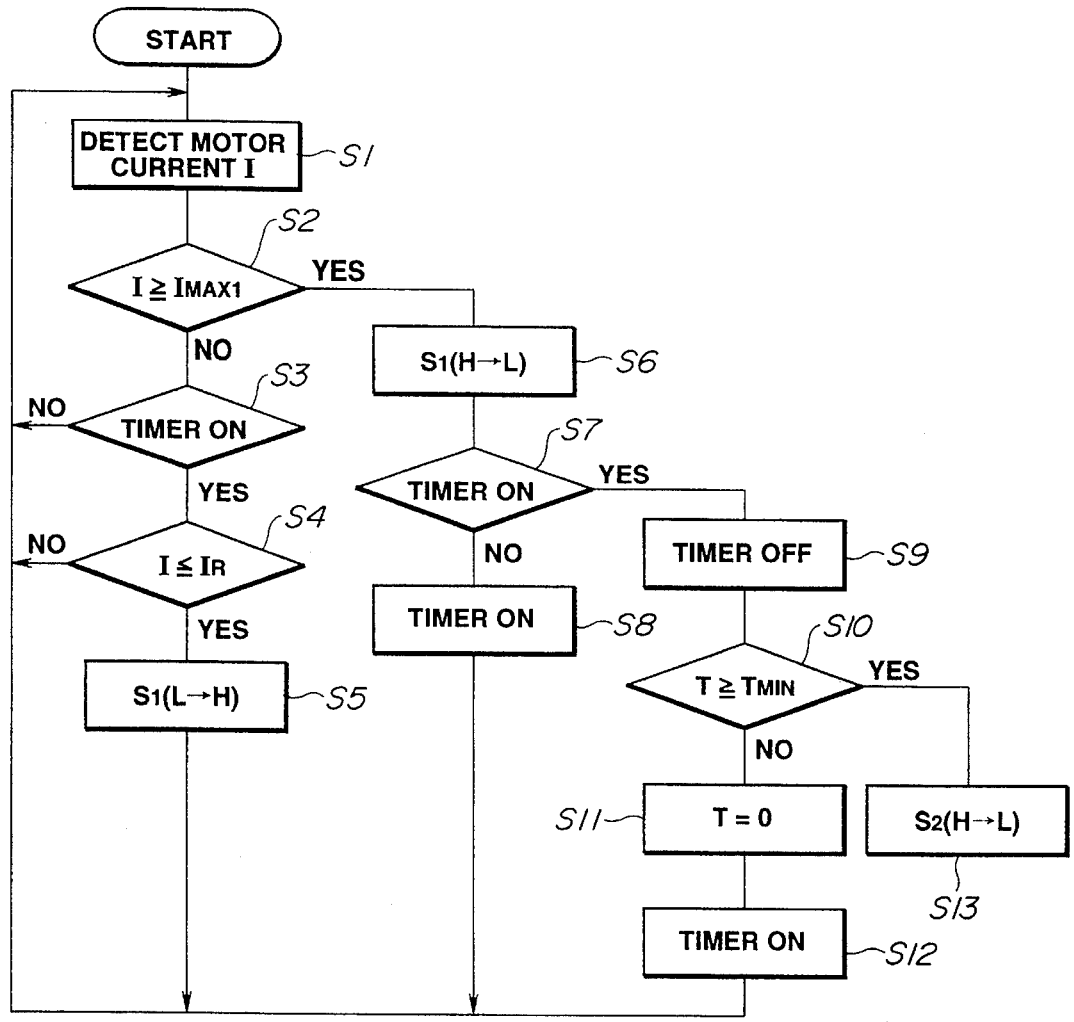
FIG. 3 is a flow diagram used in explaining the operation of the electric motor drive control apparatus to inhibit PWM control for the electric motor.

The switching period measuring circuit 14 changes the decision signal $S_2$ to the low level causing the AND circuits 12 and 13 to interrupt the PWM control signals fed from the microcomputer 7 to the second driver circuit 11 so as to retain the electric motor 1 stopped regardless of the level of the overcurrent detection signal $S_1$ when the measured switching period T is less than the predetermined value $T_{MIN}$. This operation of the electric motor drive control apparatus of the invention will be described with reference to the flow diagram of FIG. 3. It is now assumed that a current I flows in the direction indicated by the arrow I of FIG. 1 to drive the electric motor 1 in a direction. At the step S1, the overcurrent detecting circuit 6 reads the motor current I measured by the current sensor 4. At the step S2, a determination is made as to whether or not the read motor current I is equal to or greater than the first reference value $I_{MAX1}$. If the answer to this question is "no", then, at the step S3, another determination is made as to whether or not the timer counter of the switching period measuring circuit 14 is ON or operating to count clock pulses. If the answer to this question is "no", then the motor current I is detected again at the step S1. Otherwise, at the step S4, a determination is made as to whether or not the read motor current I is equal to or less than the second reference value $I_R$ less than the first reference value $I_{MAX1}$. If the answer to this question is "no", then the overcurrent detecting circuit 6 reads the motor current I again at the step S1. Otherwise, at the step S5, the overcurrent detecting circuit 6 changes the overcurrent detection signal $S_1$ from the low level to the high level causing the AND circuit 13 to pass the PWM control signal to the second drive circuit 11. Following this, at the step S1, the overcurrent detecting circuit 6 reads the motor current I again.

When the motor current I increases above the first reference value $I_{MAX1}$, that is, when an overcurrent flows through the motor 1, the answer to the question inputted at the step S2 is "yes" and the overcurrent detecting circuit 6 changes the overcurrent detection signal $S_1$ from the high level to the low level at the step S6. Following this, at the step S7, a determination is made as to whether or not the timer counter is ON or operating to count the clock pulses. If the answer to this question is "no", then the timer counter is turned ON or started to count the clock pulses. Upon completion of this step, the motor current I is detected again at the step S1. Otherwise, at the step S9, the timer counter is turned OFF. The count of the timer counter, that is, the switching period T is read. At the step S10, a determination is made as to whether or not the read switching period T is equal to or less than the reference value $T_{MIN}$. If the answer to this question is "no", then, at the step S11, the count T of the timer counter is cleared to zero and then at the step S12, the timer counter is turned ON. Following this, the motor current I is detected again at the step S1.

If the read switching period T is equal to or less than the reference value $T_{MIN}$, then it means that a great degree of transient power losses occurs to cause a rapid increase in the heat generated from the transistor TR4 and, at the step S13, the switching period measuring circuit 14 changes the decision signal $S_2$ from the high level to the low level causing the AND circuit 13 to interrupt the PWM control signal fed thereto from the microcomputer 7 so as to turn the transistor TR4 OFF. As a result, the electric motor 1 comes to a stop. This is effective to avoid an excessive amount of heat generated from the fourth transistor TR4.

The decision signal $S_2$ is also fed from the switching period measuring circuit 14 to the microcomputer 7. The microcomputer 7 changes the relay drive signal to a low level so as to turn the transistor TR5 OFF, causing the relay controlled switch 3A to interrupt the supply of power to the drive circuit when the decision signal $S_2$ is at the low level.

A similar explanation is applicable to the operation made to avoid an excessive amount of heat generated from the third transistor TR3.

Figure 4:
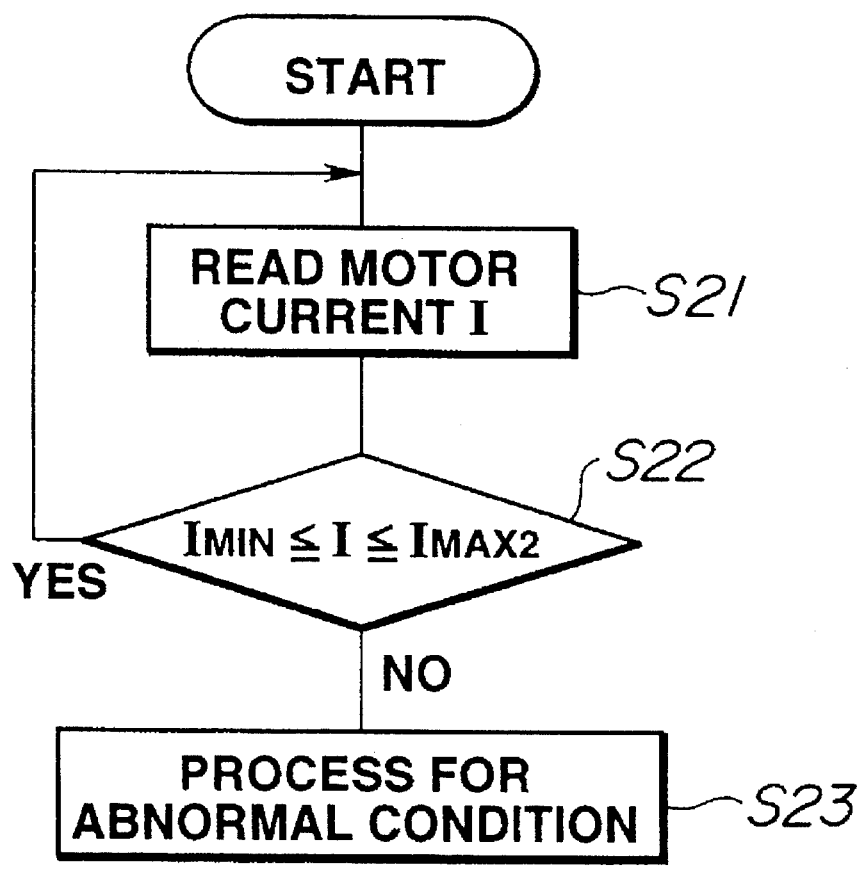
FIG. 4 is a flow diagram used in explaining the operation of the electric motor drive control apparatus to interrupt the power to the electric motor drive circuit.

Referring to FIG. 4, the operation of the electric motor drive control apparatus of the invention will be described further. At the step S21, the current monitor section 7A reads the measured motor current I. At the step S22, a determination is made as to whether or not the measured motor current I is in a predetermined range defined between first and second limit values $I_{MIN}$ and $I_{MAX2}$. If the answer to this question is "yes", then it means the motor current I is normal and the current monitor section 7A read the motor current I again at the step S21. Otherwise, a predetermined process is made for the detected abnormal condition at the step S23. In this embodiment, the microprocessor 7 produces a low level signal at the output terminal P13 to turn the transistor TR5 OFF. As a result, the relay controlled switch 3A opens to interrupt the power to the motor drive circuit. The second limit value $I_{MAX2}$ is greater than the reference value $I_{MAX1}$. Thus, when the motor drive circuit is subject to a failure causing an overcurrent to flow through the electric motor 1 for any of reasons, the power to the motor drive circuit is interrupted so as to remain the electric motor 1 stopped.

Although the PWM control signals are produced from the microcomputer 7 to switch the switching transistors on and off, it is to be understood that the invention is also applicable to other electric motor control systems. For example, the switching transistors may be controlled to be on to operate the electric motor 1 and off to stop the electric motor 1.

Figure 5:
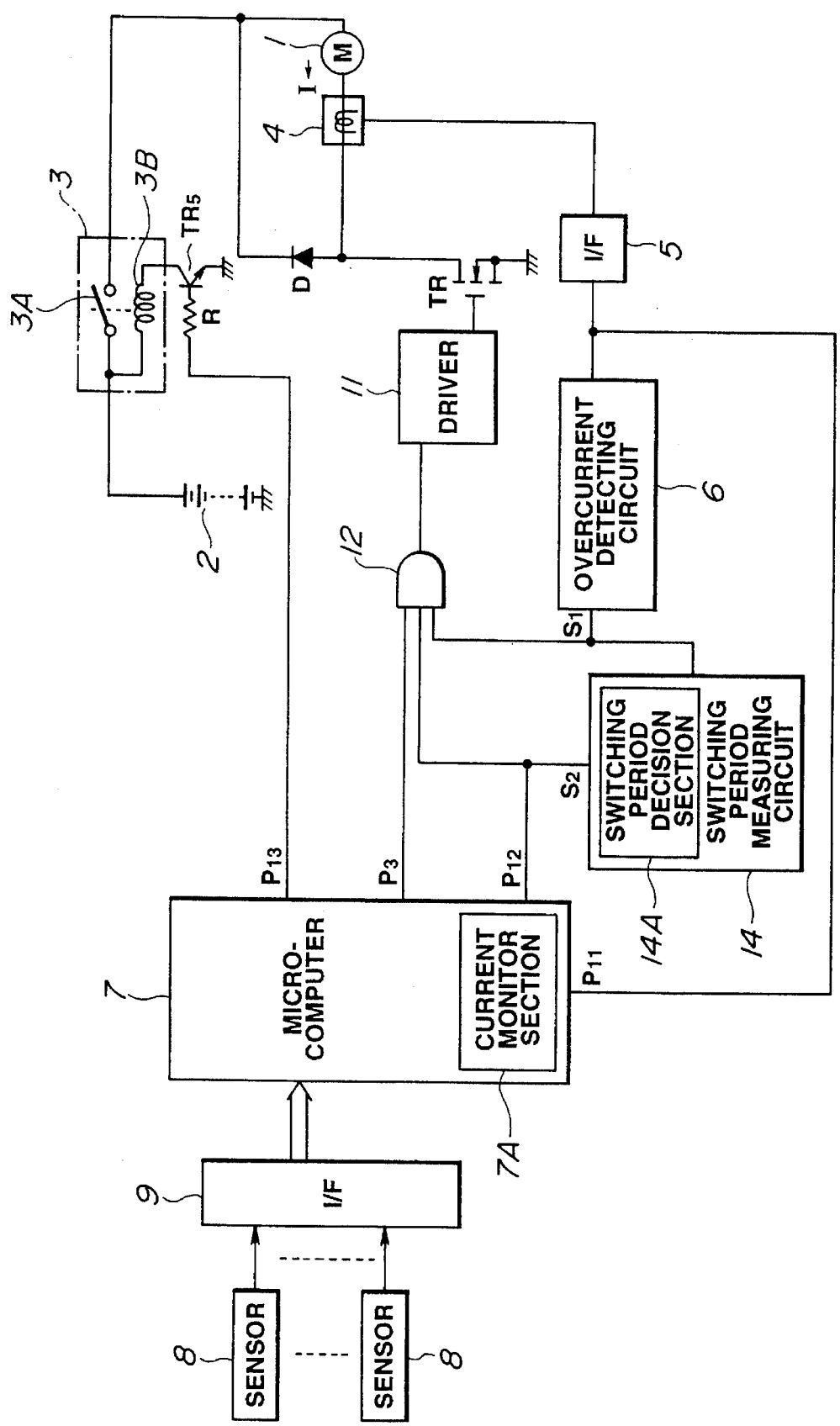
FIG. 5 is a schematic block diagram showing a second embodiment of the electric motor drive control apparatus of the invention.

Referring to FIG. 5, there is illustrated a second embodiment of the motor drive circuit control apparatus of the invention. This embodiment is substantially the same as the first embodiment except for its application to an electric pump type power steering mechanism. In this embodiment, the electric motor 1, which is designed to rotate only in one direction, is used to drive an oil pump to furnish oil so as to produce a force assisting the driver's steering operation. The motor drive circuit has a simple arrangement including a single switching transistor TR and a diode D.

In this embodiment, the microcomputer 7 produces a PWM control signal through the AND circuit 12 to a drive circuit 11 which thereby switches the transistor TR on and off to drive the electric motor 1. The current I through the electric motor 1 is sensed and used substantially in the same manner as described in connection with the first embodiment to avoid an excessive amount of heat generated from the transistor TR.

What is claimed is:

1. An apparatus for controlling a drive circuit having a supply of electric power from a power source to drive an electric motor, the drive circuit including at least one switching element operable between a first state connecting the electric motor to the power source and a second state disconnecting the electric motor from the power source in the second state, the apparatus comprising:

means for sensing a current flow through the electric motor;

means for producing an overcurrent detection signal when the sensed current exceeds a predetermined value;

means responsive to the overcurrent detection signal for changing the switching element to the second state;

means for measuring a repetitive period of the overcurrent detection signal; and means for fixing the switching element in the second state when the measured repetitive period is less than a predetermined value.

2. The electric motor drive control apparatus as claimed in claim 1, further including means for producing a failure signal when the sensed current is out of a predetermined range, and means responsive to the failure signal for interrupting the power to the drive circuit.

3. The electric motor drive control apparatus as claimed in claim 1, wherein the overcurrent detection signal producing means includes means for producing the overcurrent detection signal when the sensed current increases above a first predetermined value and interrupting the overcurrent detection signal when the sensed current decreases below a second predetermined value less than the first predetermined value.

4. The electric motor drive control apparatus as claimed in claim 3, further including means for producing a failure signal when the sensed current is out of a predetermined range, and means responsive to the failure signal for interrupting the power to the drive circuit.

* * * * *